United States Patent Office 3,579,724
Patented May 25, 1971

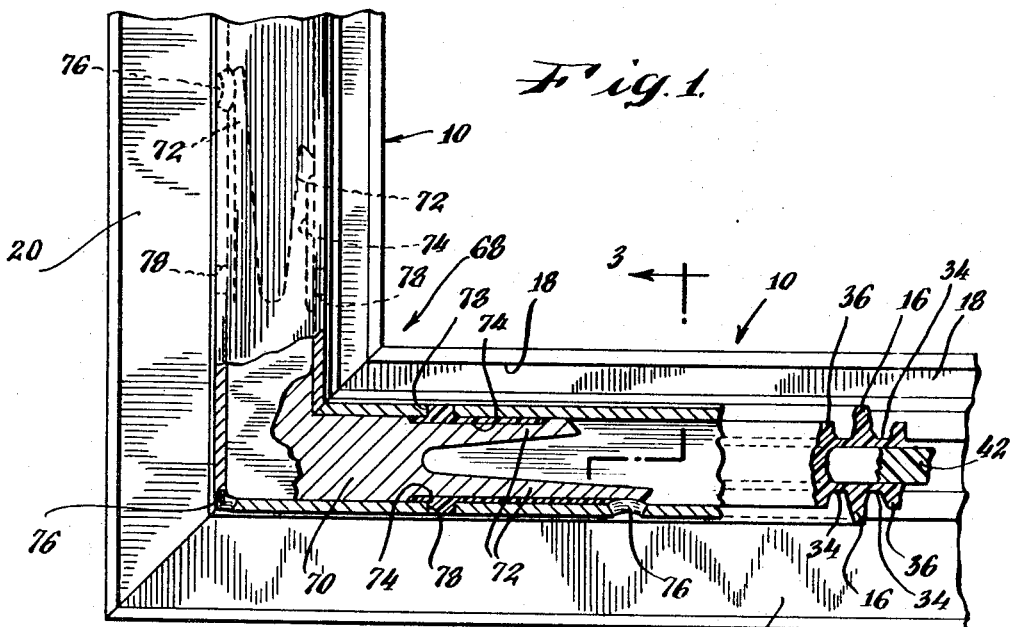
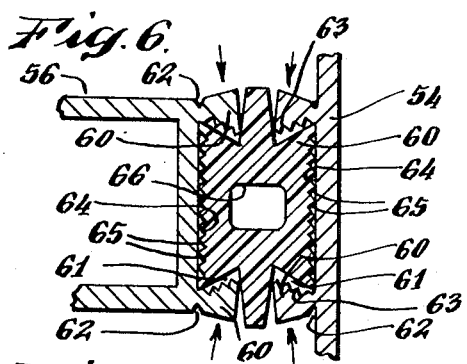
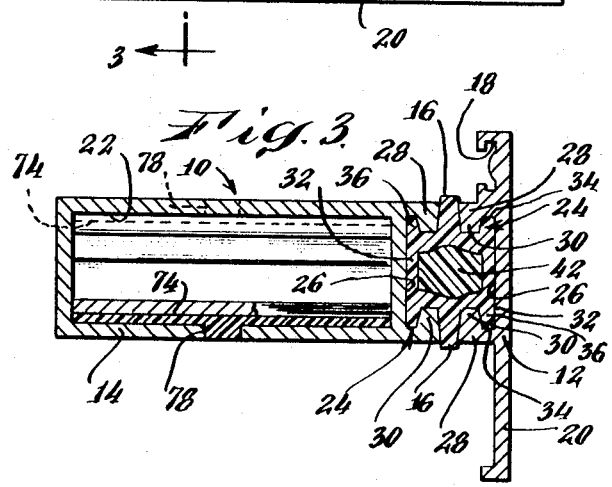
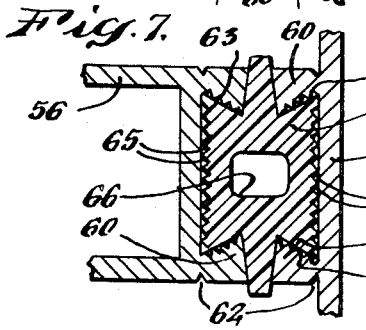
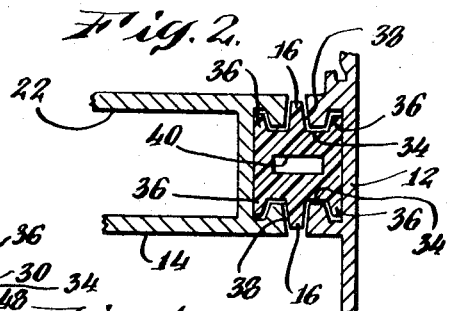
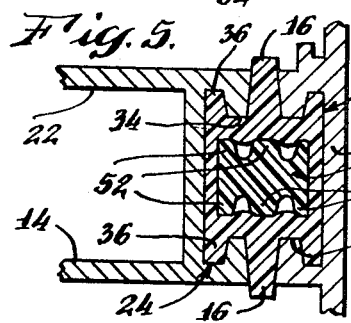
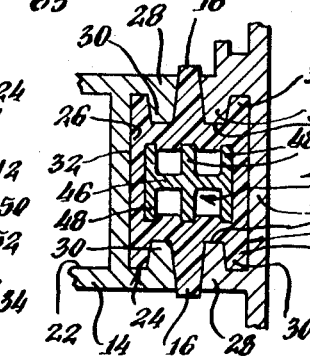

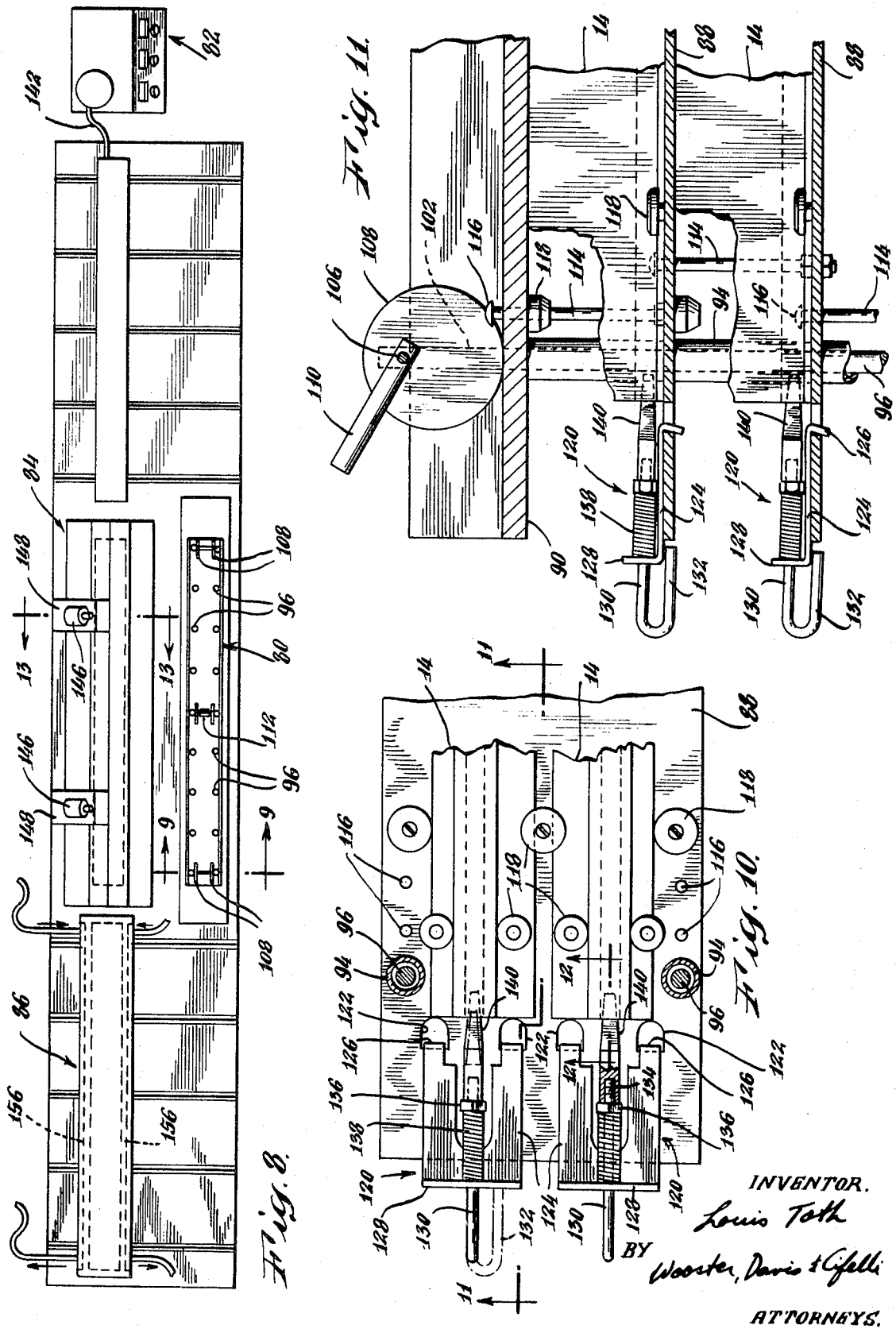

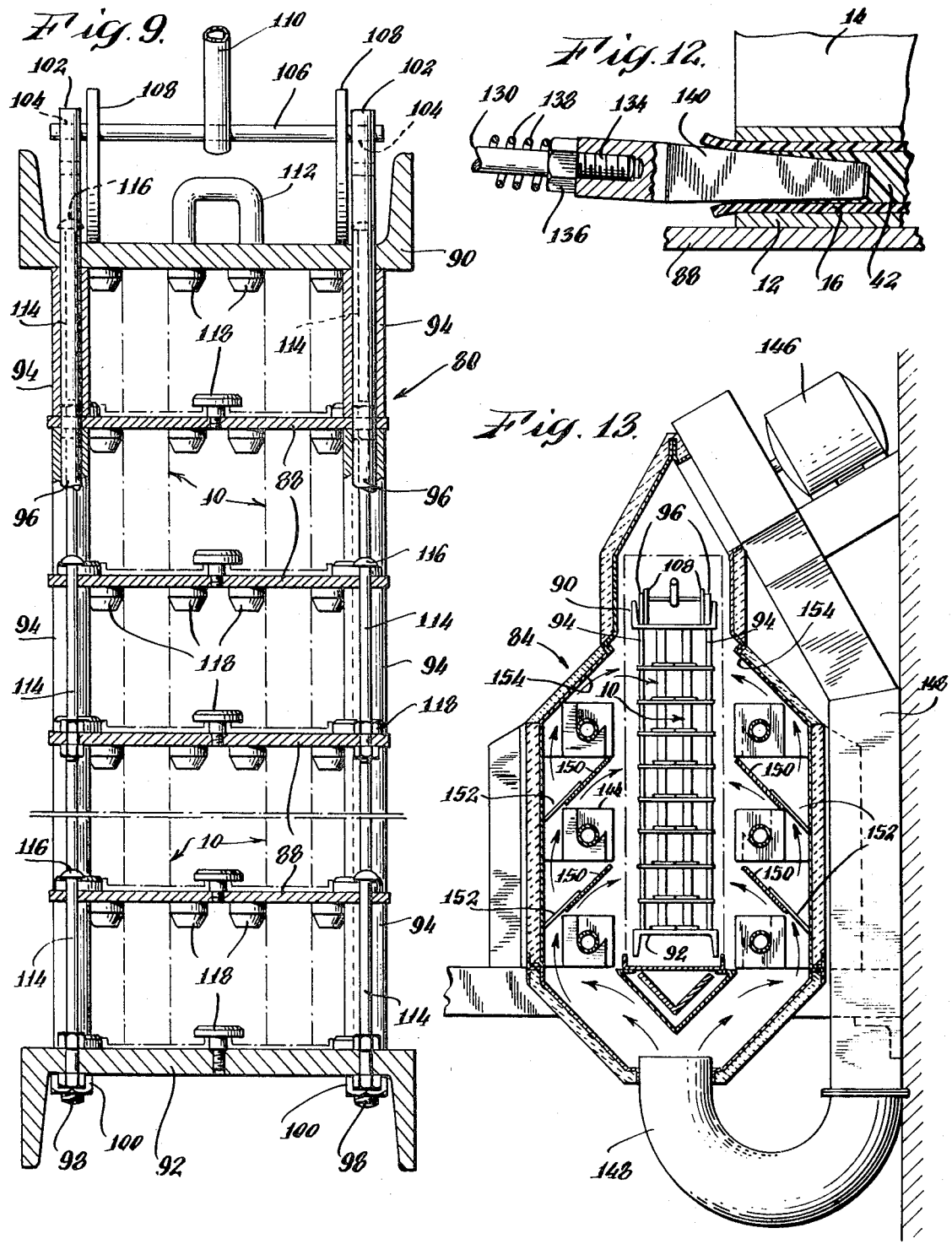

3,579,724
APPARATUS FOR THE MANUFACTURE OF COMPOSITE STRUCTURAL ELEMENTS
Louis Toth, Easton, Conn., assignor to Anchor Enterprises Corporation, Bridgeport, Conn.
Original application May 8, 1967, Ser. No. 636,866, now Patent No. 3,517,472, dated June 30, 1970. Divided and this application Sept. 19, 1969, Ser. No. 859,426
Int. Cl. B29d 3/02, 12/00; B29c 27/00
U.S. Cl. 18—4
4 Claims

ABSTRACT OF THE DISCLOSURE

A structural element with thermal barrier means having an elongated thermal insulating plastic locking member with portions which interlock in elongated tracks formed in two elongated metal members to form a rigid unitary member.

RELATED U.S. APPLICATION

This application is a division of application Ser. No. 636,866, filed May 8, 1967, now Pat. No. 3,517,472.

BACKGROUND OF THE INVENTION

This invention relates to an improved composite structural element having a thermal barrier and more particularly such element of the type which may be used in window construction for frames and/or sashes.

Insulating materials are well known to the construction art and are used wherever thermal or electrical transfer through a structural element is to be restricted. In window construction applications it is well known to provide such elements which are compositely formed and include an insulating material interposed between two metallic structural members. Such composite structural elements, whether frames or sashes, are necessary to prevent cold transfer from the exterior of the building to the interior thereof or more properly to prevent heat transfer from the interior through the structural element to the exterior thereof. They are also necessary to assist in maintaining sufficiently high surface temperatures on the interior members for preventing condensation from forming thereon. In the known prior art construction of these structural elements the thermal barrier usually comprises a thin sheet of thermal insulating material disposed between two metal structural members which are generally lap joined. These members may be glued together but are usually secured together by screws or rivets which pass through both metal members and the insulation to form a unitary structural member. This prior art constuction has been found to lack rigidity. Another prior art construction is substantially more rigid and compises tongue-in-groove joined metal structural members with a sheet of thermal insulating material interposed between the joined members, the members being usually secured by screws or rivets although they may be glued. Two patents issued to me, each entitled Weather Tight Window Construction namely 2,711,232 issued June 21, 1955 and 2,798,578 issued July 9, 1957 are representative of the above described prior art lap-type construction. Since the above described prior art constructions generally require auxiliary securing means for fastening the metal structural members together, and rivets or screws used for this purpose provide plural direct paths of thermal conduction from one structural metal member to the other, the insulating characteristics of these known structural elements are very inefficient.

It is of primary importance that a composite structural element having a thermal barrier be constructed in such a manner that its overall cross-sectional dimension be exactly maintained as if it were a solid shape. This is necessary to permit cut to length and mitred pieces to be fitted together to form exact corners of the rectangular frames or sashes without necessitating any machining. This is important since the development and widespread use of precoated or plated materials for metal window frames and sashes cannot be dressed down or machined after assembly to line up mismatched corners as could be done with plain, unfinished metallic members.

SUMMARY OF THE INVENTION

Accordingly, it is a primary object of this invention to provide an economical improved composite, dimensionally exact, rigid structural element with a thermal barrier which does not require auxiliary fastening means for securing the metal structural members together.

Another object is to provide an improved frame or sash window construction utilizing my novel composite structural element and having rigid corners.

A further object is to provide novel apparatus for manufacturing my novel composite structural element so that it is dimensionally exact.

To accomplish these objects in one form a composite structural element with thermal barrier is provided which comprises a first metal member formed with an elongated track on one side thereof, a second metal member formed with a similar elongated track on one side thereof, and a non-metallic thermal insulating locking member having wedge shaped longitudinal beads adapted to enter the tracks of each of the metal members for rigidly securing the metal members together.

BRIEF DESCRIPTION OF THE DRAWINGS

Other objects and further details of that which I believe to be novel and my invention will be clear from the following description and claims taken with the accompanying drawings wherein:

FIG. 1 is an elevational view of a window-frame corner constructed in accordance with my invention partially broken away to show the locking and insulating member of the composite structural element;

FIG. 2 is a sectional view taken through my novel composite structural element prior to expansion of the locking member;

FIG. 3 is a sectional view taken substantially along line 3—3 of FIG. 1 showing the expanded locking member and the novel corner securing member;

FIG. 4 is a sectional view similar to that of FIG. 3 showing an alternate expanding member;

FIG. 5 is a sectional view similar to that of FIG. 3 showing an alternate expanding member;

FIG. 6 is a sectional view of an alternative construction of my composite structural element prior to securing the locking member;

FIG. 7 is a sectional view of the completed element of FIG. 6;

FIG. 8 is a plan view of the apparatus used to manufacture the composite structural element of FIG. 3;

FIG. 9 is a sectional view taken substantially along line 9—9 of FIG. 8 showing the clamping fixture;

FIG. 10 is a plan view of a portion of a support plate showing the positioning rollers and plug bodies;

FIG. 11 is a sectional view taken substantially along line 11—11 of FIG. 10;

FIG. 12 is an enlarged sectional view taken substantially along line 12—12 of FIG. 10 showing a portion of a plug body; and FIG. 13 is a sectional view taken substantially along line 13—13 of FIG. 8 showing the interior of the curing oven.

DESCRIPTION OF THE PREFERRED EMBODIMENTS

Referring in detail to FIGS. 1–5 there are illustrated several forms of the composite structural element with thermal barrier, generally designated by the numeral 10 and constructed in accordance with my invention. Structural elements 10 are used for window frames; however, it should be understood that the theory of my invention may be readily applied to window sashes, door frames and numerous other structural forms through which it is desired to retard thermal and electrical transfer. Structural elements 10 comprise an elongated metal member 12, as elongated tubular metal member 14 and an elongated tubular plastic locking member 16 each of which may be formed by being extruded through a suitable die. The metal members 12 and 14 are preferably made of aluminum because this material is strong, light in weight and pleasing in appearance and the locking member 16 is made preferably of a rigid plastic material having a low coefficient of thermal conductivity, such as a 95 durometer vinyl.

The metal members are extruded in the unique shapes required for performance of their intended function, as for example, the window frame structural element shown includes the member 12 having a seal retaining groove 18 and a flange wall portion 20, while the metal member 14 includes a tubular portion 22 for forming a corner as will become apparent. Each metal member 12 and 14 is formed with a track 24 for capturing a portion of the locking member 16 which track is defined by a planar wall portion 26 at its root, spaced walls 28 extending normal thereto and inwardly facing wedge shaped beads 30 located at the end of walls 28. Locking member 16 is formed with opposed planar side walls 32 and four tapered bead receiving seats 34 thus defining wedge shaped locking ribs 36 and wedge shaped barrier ribs 38.

The manufacturing tolerances in the extruded tracks 24 of metal members 12 and 14 and those of plastic locking member 16 may cumulate to result in a very loose fit; therefore, it is insufficient to simply assemble these members by introducing the locking member 16 into the tracks 24 for forming the composite structural element 10. My invention comprehends the further step of expanding the locking member 16 by introduction of an expanding means into a longitudinal passage 40 formed in the extruded plastic member 16. Thus, the locking member 16 may be safely extruded slightly smaller than the tracks 24 for ease of assembly (note FIG. 2) while expansion of members 16 insures a rigid fit. Prior to assembly of the three members 12, 14 and 16 the tracks 24 may be coated with an epoxy or other suitable adhesive which serves the dual function of serving as a lubricant so that the plastic member 16 may be more easily inserted into the tracks and adding structural strength to the composite structural element 10 when it is cured.

Several expanding means comprehended by my invention are illustrated in the various modifications illustrated in FIGS. 3–5.

FIG. 3 illustrates the preferred embodiment of my invention in which a foam material 42, such as a polyurethane, is introduced into the passage 40 for expanding the locking member 16. Expansion of the keying member 16 causes the wedge shaped locking ribs 36 to be forced into the tracks 24 and the barrier ribs 38 to be forced between the ends of the walls 28, for locking the wedge shaped beads 30 into seats 34. The foam material 42 has a tendency to expand and harden under the influence of heat and since the expansive force of the expanding foam is very great, it is necessary to maintain the composite structure 10 in its FIG. 2 condition in a clamping fixture or jig (see FIG. 9) during the foam filling and curing operation in order to insure standard overall dimensions of the composite structure 10. Curing of the foam 42 is achieved by maintaining the composite structure at a temperature of approximately 160° F. for 15–20 minutes and performs several important functions. First, it expands and hardens the foam material 42, and second, it causes the plastic locking member 16 to soften and to be firmly urged by the force of the expanding foam into any irregularities in the tracks 24 for securing a very strong mechanical bond between metal members 12 and 14. Another resultant advantage is the possibility to use a harder plastic material than can be used with mechanical expanding means since the plastic member 16 is softened at the curing temperature.

In FIG. 4 there is illustrated another expanding means for transforming the loosely assembled FIG. 2 arrangement into a rigid structural element. In this embodiment of my invention, the locking member 16 is expanded by means of a metal spline 44 which may be drawn through the generally rectangular shaped longitudinal passage 40. The spline 44 may be an extruded aluminum member and includes a central body portion 46 having a plurality of substantially normal ribs 48 disposed on each side thereof. As the spline 44 is drawn through the passage 40, the spline ribs 48 expand the locking member 16 by urging the wedge shaped locking ribs 36 into the tracks 24 and the wedge shaped barrier ribs 38 between the ends of adjacent walls 28, thus forming a strong mechanical bond between metal members 12 and 14 and insuring that there is no metal-to-metal contact between these members.

In FIG. 5 there is illustrated another embodiment of the expanding means comprising an elongated plastic spline 50 which may be made of a material similar to that of the locking member 16 and having a cross-sectional shape similar to that of the aluminum spline of FIG. 4 including longitudinal ribs 52. As spline 50 is drawn through the passage 40 it is caused to stretch longitudinally thus reducing its cross-sectional area so that when the drawing force is released, the plastic spline 50 contracts lengthwise and returns to its larger cross-sectional shape, exerting an outward expansive force on the locking member 16 for urging the locking ribs 36 into the tracks 24.

In FIGS. 6 and 7 there is illustrated an alternative construction of the composite structural element incorporating my invention for mechanically bonding to metallic structural members 54 and 56 together by means of a thermal insulating plastic locking member 58 and without the use of auxiliary fastening means. Metal members 54 and 56 are formed with wedge shaped locking ribs 60 which are angularly opened as shown in FIG. 6 and define tracks 61 for receiving the locking member 58. Channels or grooves 62 formed at the roots of ribs 60 define lines of weakness about which the ribs 60 may be deformed. The track defining wall of each rib 60 is formed with longitudinal serrations 63 which improve the grip of the rib on the adjacent portion of the plastic locking member 58. The plastic member 58 is extruded to substantially its finished size, as opposed to the smaller size element 16 of the FIGS. 3–5 modifications. I have found that it is desirable to extrude this plastic member slightly larger than the required size and then to freeze it and machine it to its proper size. The parallel side walls 64 are also formed with longitudinal serrations 65 which serve to reduce the contact area between the plastic and the metal members for improving the thermal insulating properties of the composite structural element. A central longitudinal passage 66 may be formed through the member 58 as shown for further improving its thermal insulating characteristics and not for serving the same function as passage 40 of the FIG. 1–5 embodiment. Once the plastic locking member has been drawn into the tracks 61, the loosely bonded element is passed through a suitable rolling mill, a press brake or other suitable force applying means for inwardly displacing the locking ribs 60 to compress and firmly clamp the plastic locking member 58 in place (as indicated by the arrows in FIG. 6).

I have found that another method of forming the composite structural element of my invention is suitable specifically for use in long run or high volume manufacture of these frames or sash elements. This structure (not shown) comprises the two metal members similar to those designated as 12 and 14 which are separated and secured together by a solid plastic locking member. This composite structural element may be continuously formed by extruding the plastic material directly into the longitudinal tracks formed in the metal members as the metal members are longitudinally passed through a cross-head plastic extrusion machine while being accurately positioned relative to one another as they are simultaneously continuously passed through a die or guide member mounted at the entrance of the machine. The plastic material in its molten state is continuously introduced directly into the area between the metal members and the composite structural element is continuously transferred from the extrusion machine between clamps or rollers while being cooled for accurately maintaining its overall dimensions.

The several above described composite structural elements with thermal barriers are generally manufactued in lengths of fifteen or eighteen feet. In order to form the finished frames or sashes it is understood that these lengths must be cut to size and mitered to form corners. I have devised a novel corner arrangement which is highly rigid and is designated generally by the numeral 68 as illustrated in FIG. 1. It comprises a corner brace including an L-shaped member 70 having bifurcated legs with splayed ends 72, each end having a transverse channel portion 74 defined in its outer wall. The L-shaped member 70 is preferably formed of aluminum and is cut to the desired width from a length of extruded aluminum having this L-shaped cross section.

When forming the rigid corner 68, the splayed ends 72 of each of the legs are forced together and are inserted into the tubular portions 22 of the members 14. The frictionally secured splayed ends 72 exert an outward or binding force on the walls of tubular portions 22. However, to insure a mechanical bond between members 14 and 70 the member 70 may be held in place by tack welds 76 and an epoxy adhesive may be sprayed or forced into holes 78 formed through the walls of the tubular portion 22. The epoxy fills the channels 74 and upon curing, firmly bonds the L-shaped corner 70 to the metal member 14, thus rigidifying the frame.

DESCRIPTION OF MANUFACTURING APPARATUS

For manufacturing dimensionally exact composite structural elements 10 constructed with the foam expanding means as shown in FIG. 3 I have devised the apparatus as schematically represented in FIG. 8. My novel apparatus includes a clamping fixture 80 into which are loaded a plurality of composite structural elements in their FIG. 2 condition; a mixing and filling machine 82 for introducing the foam 42 into the longitudinal passages 40; a curing oven 84 for expanding and hardening the foam; and a cooling chamber 86 for hardening the softened plastic locking member 16.

The clamping fixture 80 is illustrated in detail in FIGS. 9–12 and is designed for the mass production of fifteen and eighteen foot lengths of my composite structural element 10. The fixture 80 includes plural spaced support plates 88 each of which may accommodate two elements 10 (as seen in dot-dash lines in FIG. 9) disposed between an upper channel member 90 and a lower channel member 92. It should be understood that the support plates 88 must be locked in accurately spaced relationship during the foam filling operation since the curing foam expands rapidly and under great pressure. The support plates 88 are accurately spaced by spacing tubes 94 which encircle clamp rods 96 which extend from above the upper channel 90 to below the lower channel 92 and have threaded lower ends 98 for receiving lock nuts 100 and extend beyond the upper channel 90 at their upper ends 102. Pivot openings 104 are defined through ends 102 so that two opposed clamp rods 96 may receive a pivot shaft 106 upon which are mounted eccentric locks 108 and a short operating handle 110. The eccentric locks 108 are shown in the locked position in FIGS. 9 and 11 and slight clockwise rotation of the handle (as viewed in FIG. 11) will unlock the clamp rods 96 allowing the plates 88 to be separated by grasping a lifting eye 112 disposed upon the channel member 90 and raising the upper channel member 90 with a suitable lifting means. As the upper channel 90 is lifted, the plates 88 are also raised by lifting bolts 114 which are slightly longer than the space between the plates 88, so that the composite structural elements 10 may be easily loaded into position between the plates 88. The elements 10 are held square and in proper position by the positioning rollers 118 mounted on the plates.

Once the composite structural elements 10 have been properly positioned, clamping plugs 120 are mounted on the left end of the plates 88 (as viewed in FIG. 8) in D-shaped openings 122 provided therefor. The clamping plugs 120 include a body member 124 including substantially normal feet 126 for insertion in the openings 122 and a normal wall 128 through which shaft 130 is mounted. The shaft 130 includes a U-shaped end forming a handle 132 and a threaded remote end 134 upon which is secured a nut 136, for retaining a compression spring 138 biased against the wall 128, and a taper plug 140. As shown in dot-dash lines in FIG. 10 the taper plug 140 is normally retracted when the handle 132 is biased against the wall 128 and is in its forward or plugging position as shown in solid lines and as clearly seen in FIG. 12.

The loaded clamping fixture 80 is moved into position adjacent the mixing and filling machine 82 in which the resin and activating agent having been independently heated are pumped separately to a beater in which they are mixed in the proper proportions and then to a nozzle from which the foam is injected into the passages 40 through a hose 142. It has been found that the difficult operation of propelling a rapidly expanding and hardening foam for fifteen or eighteen feet through a small passage measuring approximately ¼ inch by ⅜ inch can be accomplished only by introducing pressurized air to the foam at the nozzle in order to rapidly propel the foam before it hardens. When the foam begins to flow from the remote end of the passage 40, the handle 132 of the clamping plug 120 is turned to the position shown in solid lines in FIGS. 10 and 11 thus driving the taper plug 140 into and closing the passage 40 for preventing leakage of the foam (note FIG. 12) and confining the foam in the passage 40 where its expansion is used beneficially as fully described above.

After having filled and plugged each of the passages 40, the entire fixture 80 is moved into position into the curing oven 84 as shown in dot-dash lines in FIG. 8. The entrance end wall of the oven is closed and the fixture 80 is heated to approximately 160° F. and is left in the oven for approximately fifteen or twenty minutes. FIG. 13 illustrates the unique design of my highly efficient curing oven for rapidly heating a large mass as represented by the fixture 80. The oven 84 comprises a chamber in which two banks of steam carrying finned tube space heaters 144 are disposed, with three rows of heaters in each bank. For maximum heating efficiency a constant air flow over the clamping fixture is insured by the blowers 146 which exhaust the heated air from the top of the chamber and recirculate it through the ductwork 148 back to the bottom of the chamber. This air flow is aimed directly over each of the stacked composite structural elements 10 by means of baffles 150 held in place by supporting struts 152 and the upper walls 154 of the oven (as indicated by the arrows in FIG. 13).

It has been explained that the curing oven expands and hardens the foam while simultaneously softening the plastic locking member 16 for insuring that the plastic material is forced into the tracks 24 by the expanding foam.

This heat softened plastic is then cooled and hardened in the cooling chamber 86 which comprises an elongated housing having foraminous hoses 156 mounted in a serpentine manner on the side walls of the chamber. Tap water is fed to the hoses for cooling the entire mass of the fixture 80 and its contents in approximately fifteen minutes. After cooling, the entire chamber 86 is shifted from a first position in line with the curing oven 84 to a second position in line with a loading and unloading station, where the fixture 80 is removed and the individual lengths of rigid, exactly sized composite structural elements with thermal barriers are unloaded.

These lengths may then be cut-to-length as needed for the manufacture of window frames or sashes in which case they are mitred for forming corners and may be fitted together as described above with regard to the structure of FIG. 1.

It should be understood that the above described novel apparatus is constructed so that it may easily be modified to accept various lengths and cross-sectional shapes of structural elements by a mere interchange of standard parts.

The disclosure regarding the composite structural element has been made by way of example and numerous changes in details of construction and the combination and arrangement of parts may be resorted to without departing from the true spirit and the scope of the invention as hereinafter claimed.

What is claimed is:

1. Apparatus for manufacture of composite structural elements comprising a clamping fixture for receiving a plurality of loosely assembled interconnected members including a first metal member, a second metal member and a plastic locking member at a loading station; a track system upon which said clamping fixture may be moved from one station of the apparatus to another; a mixing and filling machine located at a filling station for introducing a foam material to the interior of the locking members; an oven located at a curing station for expanding and hardening the foam material while softening the plastic members for allowing them to be deformed to conform to the shape of the metal members to which they are locked; and a cooling chamber located at a cooling station to which the clamping fixture is moved after being removed from the oven, for hardening the plastic locking members to form the composite structural elements.

2. The apparatus defined in claim 1 wherein said clamping fixture comprises: a plurality of stacked support plates upon which the loosely assembled members are placed; spacing means for accurately maintaining said stages separated; and clamping means for locking said support plates in their spaced positions for insuring that the finished dimensions of the composite structural elements are exactly maintained.

3. The apparatus defined in claim 2 further including plugging means mounted upon one end of said support plates said means including: plug bodies for being introduced into the foam filled passages for preventing escape of the foam; and selectively operable means for allowing said plug bodies to be moved from a retracted position to a plugging position.

4. The apparatus defined in claim 1 wherein said oven comprises: a housing defining a chamber therein within which said clamping fixture may be placed; heating means located in said oven and disposed along two sides of said clamping fixture; recirculating means for removing heated air from the top of said chamber and reintroducing it at the bottom of said chamber for creating a constant air flow over said clamping fixture; and baffle means within said chamber for insuring that there is an air-flow over each portion of said clamping fixture.

References Cited

UNITED STATES PATENTS

| | | | |
|---|---|---|---|
| 2,779,056 | 1/1957 | Ligon | 18—4(P)X |
| 2,929,793 | 3/1960 | Hirsh | 18—4(B)X |
| 3,116,349 | 12/1963 | Immel | 18—4(B)X |
| 3,149,373 | 9/1964 | Marzillier | 18—4(P)X |
| 3,410,931 | 11/1968 | Johnson | 18—4(P)X |

J. SPENCER OVERHOLSER, Primary Examiner

R. L. SPICER, JR., Assistant Examiner

U.S. Cl. X.R.

52—584, 656, 403